US008977644B2

(12) United States Patent
    Ricket et al.

(10) Patent No.: US 8,977,644 B2
(45) Date of Patent: Mar. 10, 2015

(54) COLLABORATIVE SEARCH RESULTS

(71) Applicant: Google Inc., Mountain View, CA (US)

(72) Inventors: Douglas J. Ricket, Mountain View, CA (US); Evan H. Parker, Atherton, CA (US); Marcin K. Wichary, San Francisco, CA (US); Kenson W. Yee, Newark, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/157,461

(22) Filed: Jan. 16, 2014

(65) Prior Publication Data
    US 2014/0195507 A1    Jul. 10, 2014

Related U.S. Application Data

(63) Continuation of application No. 11/868,418, filed on Oct. 5, 2007, now abandoned.

(51) Int. Cl.
    *G06F 7/00*       (2006.01)
    *G06F 17/30*      (2006.01)

(52) U.S. Cl.
    CPC ...... *G06F 17/3053* (2013.01); *G06F 17/30864* (2013.01)
    USPC ....................................................... 707/769

(58) Field of Classification Search
    None
    See application file for complete search history.

(56) References Cited

U.S. PATENT DOCUMENTS

| | | |
|---|---|---|
| 6,430,558 B1 | 8/2002 | Delano |
| 6,725,259 B1 | 4/2004 | Bharat |
| 6,745,178 B1 | 6/2004 | Emens et al. |
| 6,832,218 B1 * | 12/2004 | Emens et al. ........... 1/1 |
| 7,069,228 B1 | 6/2006 | Rose et al. |
| 7,219,090 B2 | 5/2007 | Travis, Jr. |
| 7,249,121 B1 | 7/2007 | Bharat et al. |
| 7,260,573 B1 | 8/2007 | Jeh |
| 7,533,091 B2 | 5/2009 | Plastina et al. |
| 7,610,275 B2 | 10/2009 | Gurevich et al. |
| 8,024,308 B2 | 9/2011 | Jones et al. |
| 2004/0215607 A1 | 10/2004 | Travis |
| 2005/0076003 A1 | 4/2005 | DuBose et al. |

(Continued)

FOREIGN PATENT DOCUMENTS

| | | |
|---|---|---|
| WO | WO 01/09747 | 2/2001 |
| WO | WO 2007/052285 | 5/2007 |

OTHER PUBLICATIONS

International Search Report and Written Opinion for PCT Application No. PCT/US2008/078790, dated Dec. 12, 2008.

(Continued)

*Primary Examiner* — Robert Beausoliel, Jr.
*Assistant Examiner* — Michael Pham
(74) *Attorney, Agent, or Firm* — Fish & Richardson P.C.

(57) ABSTRACT

Methods, systems, and apparatus, including computer program products, for providing alternative search results for a query. In one aspect, a method includes transmitting a set of one or more search results for a query to a client device for presentation to a user, where each search result refers to a respective resource, receiving from the client device an alternative search result submitted by the user for the query, associating the alternative search result with the query, and storing in a repository the query and the alternative search result, where the alternative search result is transmitted with the set of one or more search results for a new search of the query.

21 Claims, 7 Drawing Sheets

(56) References Cited

U.S. PATENT DOCUMENTS

| | | |
|---|---|---|
| 2005/0256848 A1 | 11/2005 | Alpert et al. |
| 2006/0064411 A1 | 3/2006 | Gross et al. |
| 2006/0074883 A1 | 4/2006 | Teevan et al. |
| 2006/0235873 A1 | 10/2006 | Thomas |
| 2006/0294086 A1* | 12/2006 | Rose et al. .................. 707/3 |
| 2007/0124283 A1 | 5/2007 | Gotts |
| 2007/0130126 A1 | 6/2007 | Lucovsky et al. |
| 2007/0156761 A1 | 7/2007 | Smith, III |
| 2007/0198500 A1 | 8/2007 | Lucovsky et al. |
| 2007/0208713 A1 | 9/2007 | Krishnaprasad et al. |
| 2007/0208714 A1 | 9/2007 | Ture et al. |
| 2008/0109427 A1 | 5/2008 | Miller et al. |
| 2009/0112807 A1 | 4/2009 | Bahn |

OTHER PUBLICATIONS

International Preliminary Report on Patentability for PCT Application No. PCT/US2008/078790, dated Apr. 15, 2010.

Maurice Coyle et al., "Information Recovery and Discovery in Collaborative Web Search," Advances in Information Retrieval; [Lecture Notes in Computer Science; LNCS] Springer Berlin Heiderberg, Berlin, Heidelberg, vol. 4425, Apr. 2, 2007, pp. 356-367.

Office Action dated May 16, 2012 from related European Application No. 08 835 172.1-2201, 8 pages.

* cited by examiner

COLLABORATIVE SEARCH RESULTS

CROSS-REFERENCE TO RELATED APPLICATIONS

This application is a continuation application of, and claims priority to, pending U.S. patent application Ser. No. 11/868,418, filed on Oct. 5, 2007, entitled "Collaborative Search Results". The disclosure of the foregoing application is incorporated herein by reference in its entirety.

BACKGROUND

This specification relates to providing alternative search results.

Internet and intranet search engines aim to identify resources (e.g., web pages, images, documents, processes, multimedia content) that are relevant to a user's needs and to present information about the resources in a manner that is most useful to the user. In response to a query submitted by a user, search engines return search results referring to resources identified as relevant to or matching the query.

Unfortunately, the search results returned by the search engine may not align well with what the user has in mind, for example, if there is ambiguity in the meaning of the query terms. Even if the search results returned are relevant objectively to the query, the results may not be relevant to the user's actual subjective needs. Intranet search engines, in particular, may return few results relevant to a given query, due to the small number of interlinked resources of an intranet relative to the large number of interlinked resources available on the Internet.

In some circumstances, the user may know of a resource that better matches the user's needs than the resources referred to by the returned search results. Alternatively, the user may identify a resource that better matches the user's needs after searching through a large number of returned search results or through resources linked to a resource referred to by one of the returned search results. In these cases, the user may want to share knowledge of the good resource with other users who search using the same query or a similar query in the future.

Some search engines allow users to suggest resource addresses for the search engine to search and index. Some administrators of search systems will accept user-suggested alternative search results, for example, through e-mails or an issue tracking system. Generally, an administrator must manually add the alternative search result (e.g., with custom software) to search results generated by the search engine before the alternative search result is available for presentation to other users.

SUMMARY

In general, one aspect of the subject matter described in this specification can be embodied in methods that include the actions of transmitting a set of one or more search results for a query to a client device for presentation to a user, where each search result refers to a respective resource, receiving from the client device an alternative search result submitted by the user for the query, associating the alternative search result with the query, and storing in a repository the query and the alternative search result, where the alternative search result is transmitted with the set of one or more search results for a new search of the query. Other embodiments of this aspect include corresponding systems and computer program products. The system includes a client device and one or more computers operable to interact with the client device and to perform the above listed actions.

These and other embodiments can optionally include one or more of the following features. Instructions and the alternative search result can be transmitted to the client device for presentation to the user, where the instructions include instructions for displaying the alternative search result in a more prominent position than the positions of the one or more search results in the set. In response to a new search of the query submitted by a different user, instructions and the alternative search result can be transmitted to a different client device for presentation to the different user, where the instructions include instructions for presenting the alternative search result and a user interface for editing or deleting the alternative search result. An identifier for the user can be received from the client device, the identifier for the user can be associated with the alternative search result, and the identifier for the user can be transmitted with the alternative search result so as to indicate that the alternative search result was submitted by the user. The query can include one or more terms, and the alternative search result can be transmitted to a client device in response to a search for a different query that includes at least one of the one or more terms. A resource can be one or more of a web page, an image, a document, a process, or multimedia content, and each search result can include a title and a link to the respective resource. For each of a plurality of alternative search results associated with a particular query, a number of times the alternative search result is presented to a user can be tracked. Alternatively or in addition, for each of the plurality of alternative search results associated with the particular query, a number of times the alternative search result is selected by a user can be tracked. The alternative search results in the plurality of alternative search results can be ranked based on the tracked numbers. For the system, the one or more computers can include a server operable to interact with the client device through a data communication network, and the client device can be operable to interact with the server as a client. The client device can include a personal computer running a web browser or a mobile telephone running a wireless application protocol (WAP) browser. The one or more computers can include one personal computer, and the personal computer can include the client device.

One possible method includes receiving a set of one or more search results for a query, where each search result refers to a respective resource, causing the display of the set of one or more search results for the query, receiving from a user an alternative search result for the query, and providing the alternative search result to a search engine, so that the alternative search result is available to users who submit new searches of the query. Other embodiments of this aspect of the subject matter described in this specification include computer program products.

These and other embodiments can optionally include one or more of the following features. A user interface can be provided for receiving an alternative search result for the query. The alternative search result can include a title and location for a resource. The display of the alternative search result and the set of one or more search results can be caused. A user interface for editing or deleting the displayed alternative search result can be provided. An identifier for the user can be provided to the search engine, and the identifier of the user can be caused to be displayed in proximity to the alternative search result so as to indicate that the alternative search result was submitted by the user. The alternative search result can be displayed in a more prominent position than the positions of the one or more search results in the set.

Particular embodiments of the subject matter described in this specification can be implemented to realize one or more of the following advantages. A user can add an alternative search result to the results page returned for a given query. The alternative search result is instantaneously available and automatically returned with other search results when the same or a different user submits the given query. The alternative search result can also be returned when a user submits a different query that is a synonym of the given query or that includes at least one of the terms of the given query. A user-friendly interface provides a way for users to directly submit, delete, or edit alternative search results which are immediately available to other users of a search system without requiring administrator approval. The ease of submission and the instantaneous availability encourage users to submit and collaborate on the alternative search results. This collaborative effort can produce search results which are more relevant to a given query than system-generated search results. The number of impressions and the number of clicks of an alternative search result can be recorded and used in ranking multiple alternative search results for a given query. User identifiers can be recorded and displayed along with the respective alternative search results to provide accountability and public recognition of users who add good results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
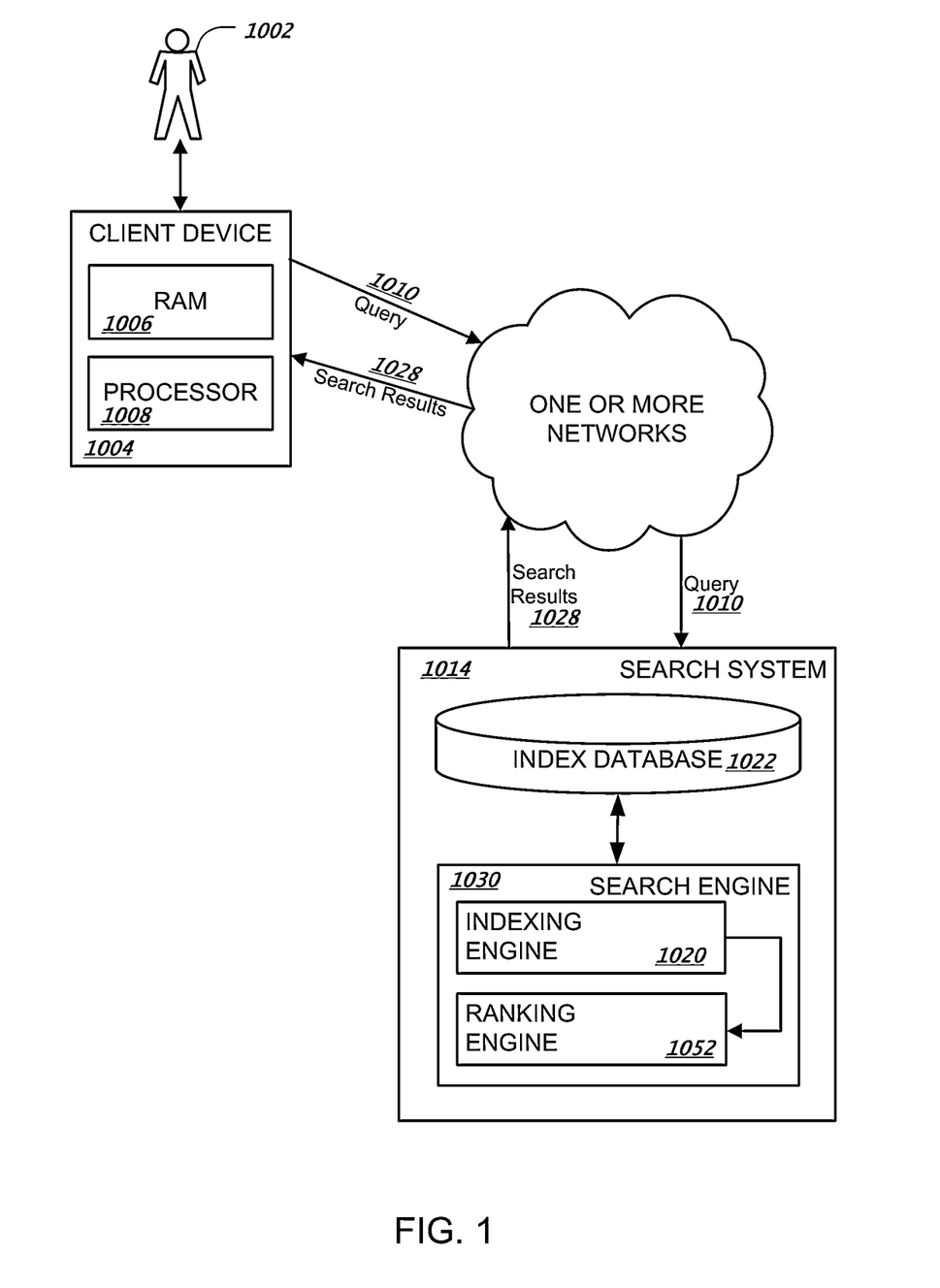
FIG. 1 shows an example search system.

FIG. 1 shows an example search system 1014 for providing search results relevant to submitted search queries as can be implemented in an internet, an intranet, or another client and server environment. The search system 1014 is an example of an information retrieval system in which the systems, components, and techniques described below can be implemented.

A user 1002 can interact with the search system 1014 through a client device 1004 (e.g., a personal computer, a mobile telephone, a personal digital assistant, a mobile audio or video player, a game console, or a combination of one or more of them). For example, the client 1004 can be a computer coupled to the search system 1014 through a local area network (LAN), e.g., an enterprise intranet, or a wide area network (WAN), e.g., the Internet. In some implementations, the search system 1014 and the client device 1004 can be one machine. For example, a user can install a desktop search application on the client device 1004. The client device 1004 will generally include a random access memory (RAM) 1006 and a processor 1008.

A user 1002 can connect to a search engine 1030 within a search system 1014 to submit a query 1010. When the user 1002 submits a query 1010, the query 1010 is transmitted through one or more wired or wireless networks to the search system 1014. The search system 1014 can be implemented as, for example, computer programs running on one or more computers in one or more locations that are coupled to each other through a network. The search system 1014 includes an index database 1022 and a search engine 1030. The search system 1014 responds to the query 1010 by generating search results 1028, which are transmitted through the network to the client device 1004 in a form that can be presented to the user 1002 (e.g., as a search results web page to be displayed in a web browser running on the client device 1004).

When the query 1010 is received by the search engine 1030, the search engine 1030 identifies relevant resources. The search engine 1030 will generally include an indexing engine 1020 that actively searches a corpus of resources (e.g., web pages, images, or news articles on an intranet or the Internet) to index the resources found in that corpus, and stores index information for the resources in an index database 1022. This index database 1022 is used to identify resources that match the query 1010.

The search engine 1030 will generally include a ranking engine 1052 (or other software) to rank the resources related to the user query 1010. The ranking of the resources can be performed using conventional techniques for determining an information retrieval score for indexed resources in view of a given query. The relevance of a particular resource with respect to a particular query term or to other provided information may be determined by any appropriate technique. The search engine 1030 can transmit the search results 1028 through the network to the client device 1004 for presentation to the user 1002.

Figure 2:
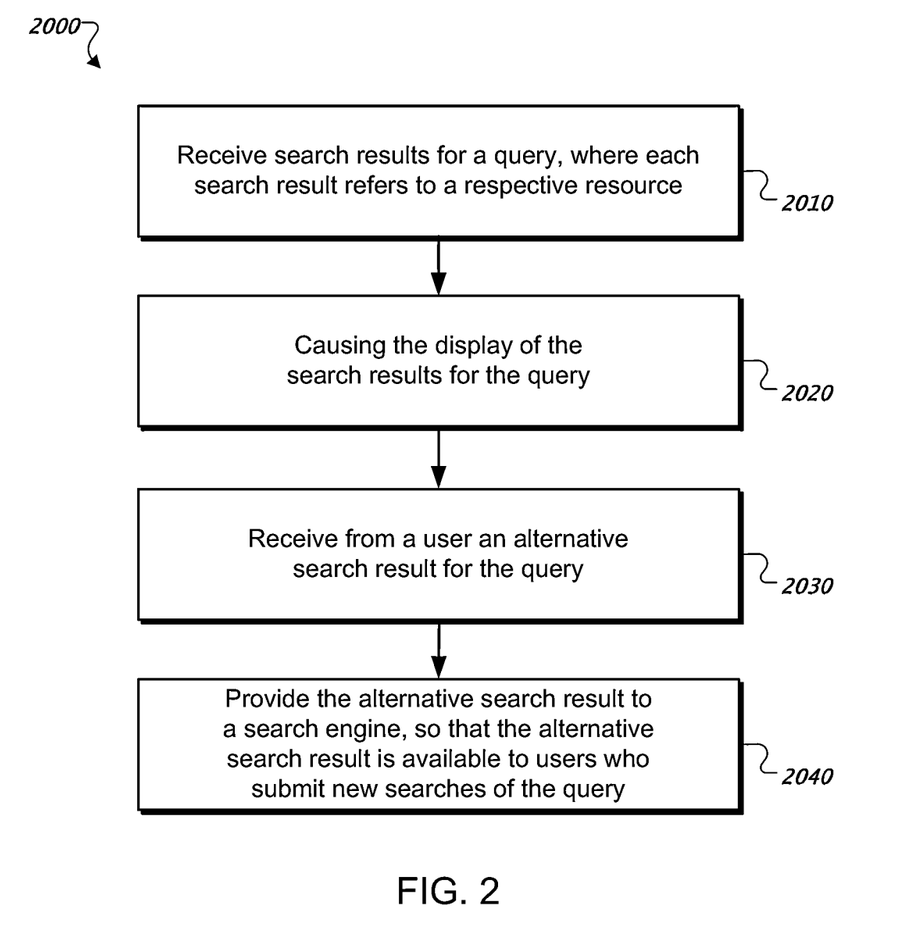
FIG. 2 shows an example process for providing an alternative search result.

FIG. 2 shows an example process 2000 for providing an alternative search result. For convenience, the example process 2000 will be described with reference to FIGS. 3-6 and a client device (e.g., client device 1004 of FIG. 1) that performs the process 2000.

The client device 1004 receives a set of one or more search results for a query, where each search result refers to a respective resource (step 2010). The client device 1004 can receive the set of search results in response to user submission of the query using the client device 1004. A resource can be one or more of a web page, an image, a document, a process, or multimedia content. Other resources are possible. A search result can include a title for the resource, a selectable link to the resource, and a snippet of content from the resource. The client device 1004 causes the display of the set of one or more search results for the query (step 2020). The search results can be displayed by a web browser on a display device that is part of or coupled to the client device 1004.

Figure 3:
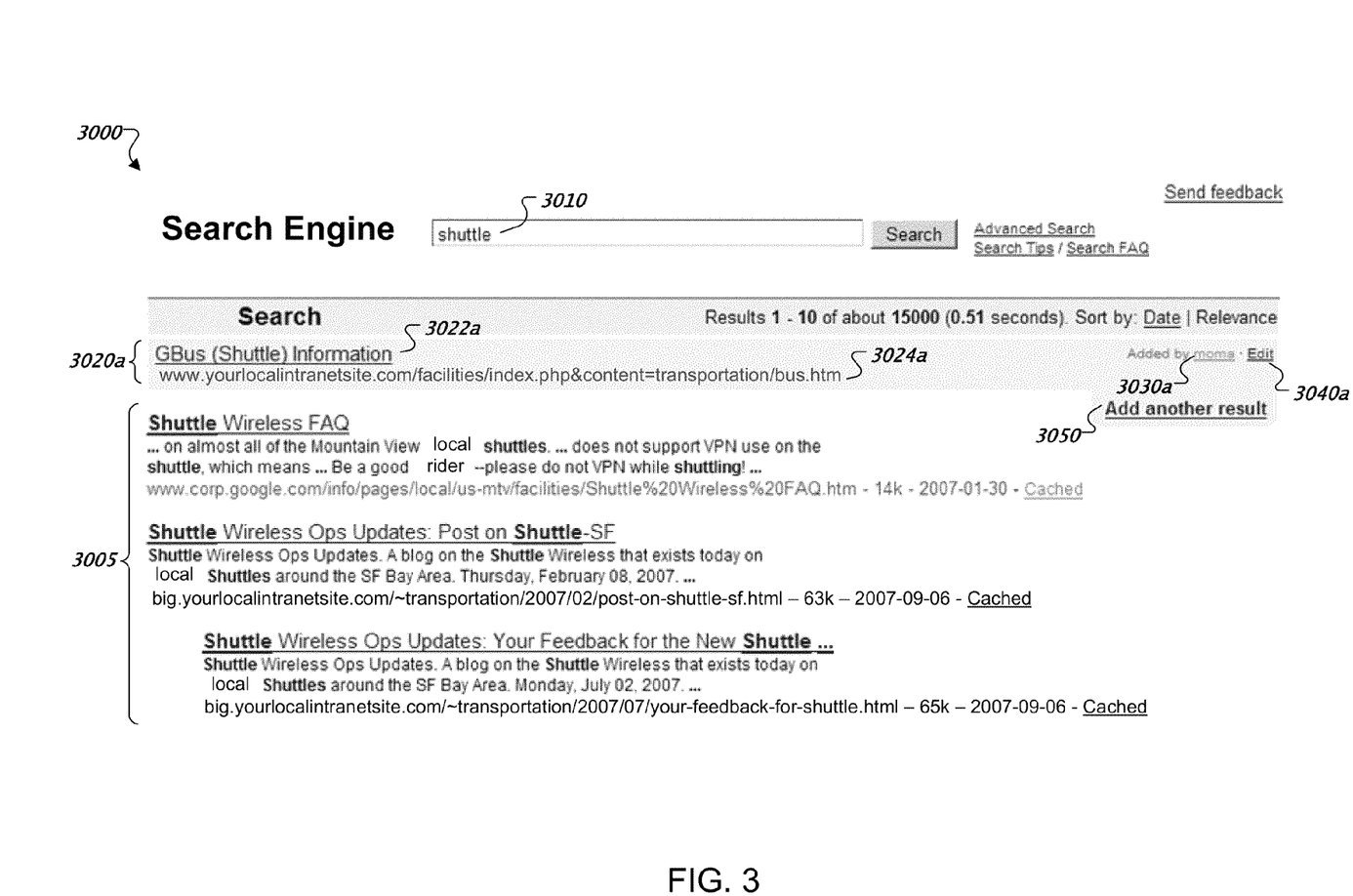
FIG. 3 illustrates an example web page of search results including an alternative search result.

FIG. 3 illustrates an example web page 3000 of search results 3005 including an alternative search result 3020a. The web page 3000 includes a query 3010, "shuttle," and a set of search results 3005 generated and returned from a search system (e.g., the search engine 1030 of the search system 1014 of FIG. 1) in response to the query 3010. In the example of FIG. 3, the system-generated search results 3005 are directed to wireless network access on a shuttle. Even if the search results 3005 are relevant objectively to the query 3010, the search results 3005 may not be relevant to the user's actual subjective needs. For example, the user may be searching for a schedule of the shuttle service, which cannot be accessed by selecting any of the search results 3005 directed to wireless network access on the shuttle.

The search system 1014 can provide to the user one or more alternative search results for the query 3010. An alternative search result is a search result that is submitted by a user of the search system 1014 to be provided to other users as an alternative to search results (e.g., search results 3005) generated by the search system 1014 for a particular query. In some implementations, in response to receiving a query submitted by a user, the search system 1014 retrieves, in parallel, the system-generated search results and the user-submitted alternative search results. For example, the search system 1014 can retrieve system-generated search results from a search engine index (e.g., index database 1022 of FIG. 1) while retrieving, in parallel, user-submitted alternative search results from an alternative search result repository. The search system 1014 can merge the retrieved search results and transmit the merged search results to the client device 1004 for presentation to the user.

The search system 1014 can transmit to the client device 1004 instructions for presenting the alternative search results to the user. These instructions can be provided with instructions for presenting the system-generated search results 3005. In various implementations, the instructions can include one or more client-side scripts (e.g., using JavaScript) which can be embedded within a hypertext document (e.g., example web page 3000) and executed by a web browser running on the client device 1004. The client-side scripts can associate regions in the hypertext document with user interface elements that, when selected, trigger one or more actions. A client-side script can include instructions for performing the one or more actions triggered by a selection.

The example web page 3000 includes a user-submitted alternative search result 3020a. The alternative search result 3020a includes a caption or title 3022a and a location or address 3024a for a resource. The alternative search result 3020a can be presented in proximity to (e.g., above) the system-generated search results 3005 in the web page 3000. In some implementations, the alternative search result 3020a is displayed in a more prominent position of the web page 3000 (e.g., at the top of the web page 3000) than the positions of the system-generated search results 3005. The presentation instructions can include instructions for presenting the alternative search result 3020a in a way that distinguishes the alternative search result 3020a from the system-generated search results 3005. For example, the alternative search result 3020a can be displayed in a different color or font or in a shaded region of the web page 3000 that is separated from the system-generated search results 3005.

In some implementations, the client device 1004 provides to the search engine 1030 of the search system 1014 an identifier 3030a for the user who submitted the alternative search result 3020a. The web browser can display the identifier 3030a in proximity to the alternative search result 3020a, to indicate that the alternative search result 3020a was submitted by that particular user. Displaying a user identifier 3030a with an alternative search result 3020a provides some accountability and promotes trust among users of the search system 1014, while deterring spam that might occur if alternative search results were submitted anonymously. In some implementations, the user identifier 3030a is a network address or a user login name, e.g., for an enterprise intranet or for a public Internet search service. In some implementations, the user identifier 3030a is anchor text for a hyperlink to additional information about the user identified by the identifier 3030a.

In some implementations, a client-side script executed by the web browser includes instructions for displaying a user interface element 3040a (i.e., the "Edit" link) for editing the associated alternative search result 3020a. Selection of the user interface element 3040a can trigger the web browser to display a user interface with the title 3022a and the address 3024a of the alternative search result 3020a displayed in editable text boxes. The user can modify the title 3022a to more accurately describe the resource or can update the address 3024a if it is outdated, for example. In effect, the ability of one user to edit an alternative search result submitted by another user provides a mechanism for users to collaborate on providing relevant alternative search results. In some implementations, a user interface element (not shown) is provided to allow the user to delete the alternative search result 3020a.

Returning to the example process 2000, the client device 1004 receives from the user an alternative search result for the query (step 2030). In some implementations, the client device 1004 provides a user interface for receiving an alternative search result for the query. In the example web page 3000, if the user does not find the alternative search result 3020a or the system-generated search results 3005 useful, the user can add another alternative search result for the query 3010 by selecting the user interface element 3050 (i.e., the "Add another result" link).

In some scenarios, a user submits an alternative search result that is part of the set of system-generated search results. For example, the user may submit the alternative search result without knowing that it is included in the system-generated search results, e.g., because it is a later-listed result in a long list of results. Alternatively, the user may know that the alternative search result is included in the system-generated search results but may submit the alternative search result regardless, because the user believes the result should be displayed in a more prominent position, e.g., at the top of the result page. In some implementations, the web browser can display a user interface element (e.g., a selectable "promote to top" link) next to each system-generated search result to allow a user to promote a result to the top of the result page without needing to duplicate the result as an alternative search result.

Figure 4:
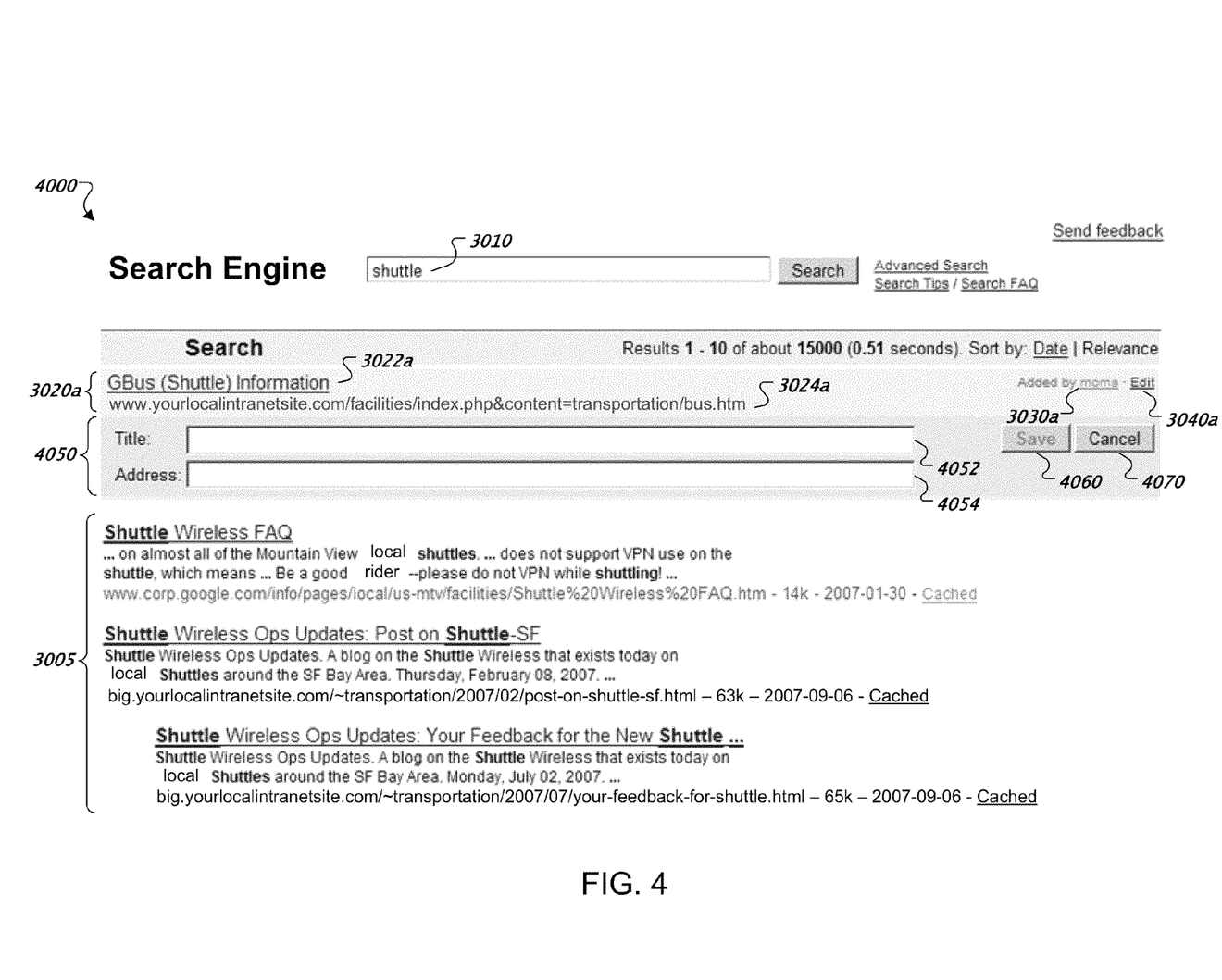
FIG. 4 illustrates an example web page of search results including a user interface for submitting an alternative search result.

FIG. 4 illustrates an example web page 4000 of search results 3005 including a user interface 4050 for submitting an alternative search result. User selection of the user interface element 3050 (i.e., the "Add another result" link) of FIG. 3 can trigger the web browser to display the user interface 4050. The user interface 4050 includes a title text box 4052 for entering a title for a resource and an address text box 4054 for entering an address for the resource (e.g., a location where the resource content is stored or accessible). The resource address can be, for example, a Uniform Resource Locator (URL), an Internet Protocol (IP) address, or a location in a network file system. In some implementations, the user can enter the resource title in the title text box 4052 as a character string with a placeholder for the query (e.g., "<placeholder> schedule," where <placeholder> would be replaced with the query 3010, "shuttle"). The user interface 4050 can include a "Save" button 4060 for saving the alternative search result and a "Cancel" button 4070 for canceling entry of the alternative search result. In some implementations, the "Save"

button 4060 is not selectable until the user has entered an alternative search result in the user interface 4050.

In some implementations, the user interface 4050 includes different or additional user interface elements, e.g., elements that allow the user to specify how an alternative search result should be matched with one or more queries. For example, the user interface 4050 can include a button or a link to additionally submit an alternative search result entered for one query (e.g., "shuttle") for another query (e.g., "bus"), so that the alternative search result will be available to users who submit either queries. As another example, the user interface 4050 could include a text field that allows the user to list all the queries (e.g., "shuttle," "bus," "shuttle bus," and "transport") for which an alternative search result is to be matched, so that the alternative search result will be available to users who submit any of the listed queries. In some implementations, an alternative search result for a given query will be returned for a search of any query that includes at least one of the terms of the given query, as will be described in more detail below.

Figure 5:
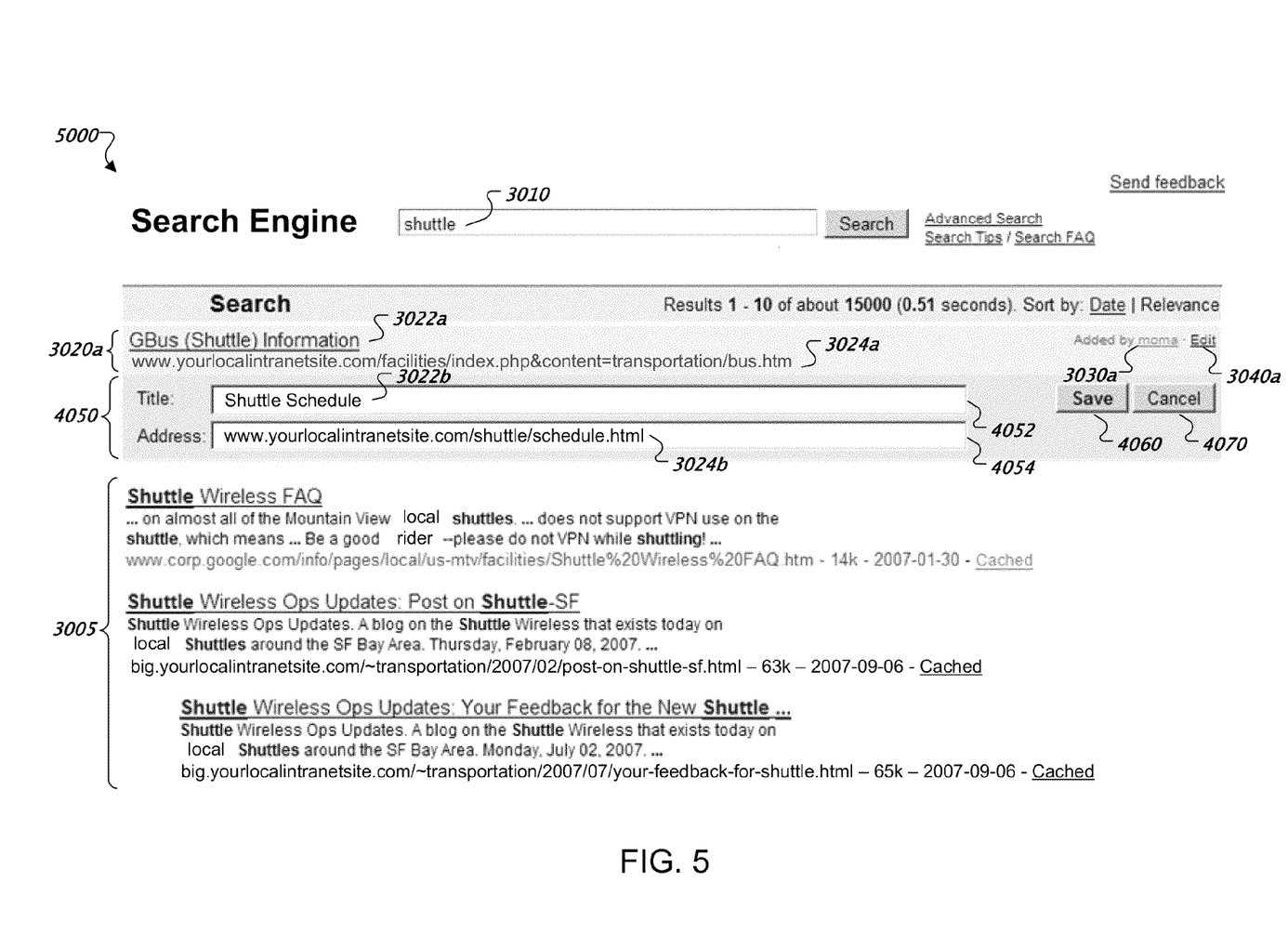
FIG. 5 illustrates an example web page of search results including an alternative search result being submitted using the user interface of FIG. 4.

FIG. 5 illustrates an example web page 5000 of search results 3005 including an alternative search result being submitted using the user interface 4050 of FIG. 4. In this example, the user has entered a title 3022b, "Shuttle Schedule," into the text box 4052 and an address 3024b, "www.yourlocalintranetsite.com/shuttle/schedule.html," into the text box 4054 for the new alternative search result. Once the user is satisfied with the new alternative search result entered in the user interface 4050, the user can select the "Save" button 4060.

Returning to the example process 2000, the client device 1004 provides the new alternative search result to a search engine (e.g., search engine 1030 of search system 1014), so that the new alternative search result is available to users who submit new searches of the query 3010 (step 2040). User selection of the "Save" button 4060 can trigger the web browser, executing a client-side script, to send a request to the search system 1014 to add the alternative search result. In some implementations, the client device 1004 causes the display (e.g., automatically) of the new alternative search result with the set of one or more system-generated search results 3005 and any existing alternative search results (e.g., result 3020a) for the query 3010. For example, once the user submits the new alternative search result, it can be available substantially immediately to all users of the search system 1014 without the new alternative search result needing to be manually added by the administrator of the search system 1014.

Figure 6:
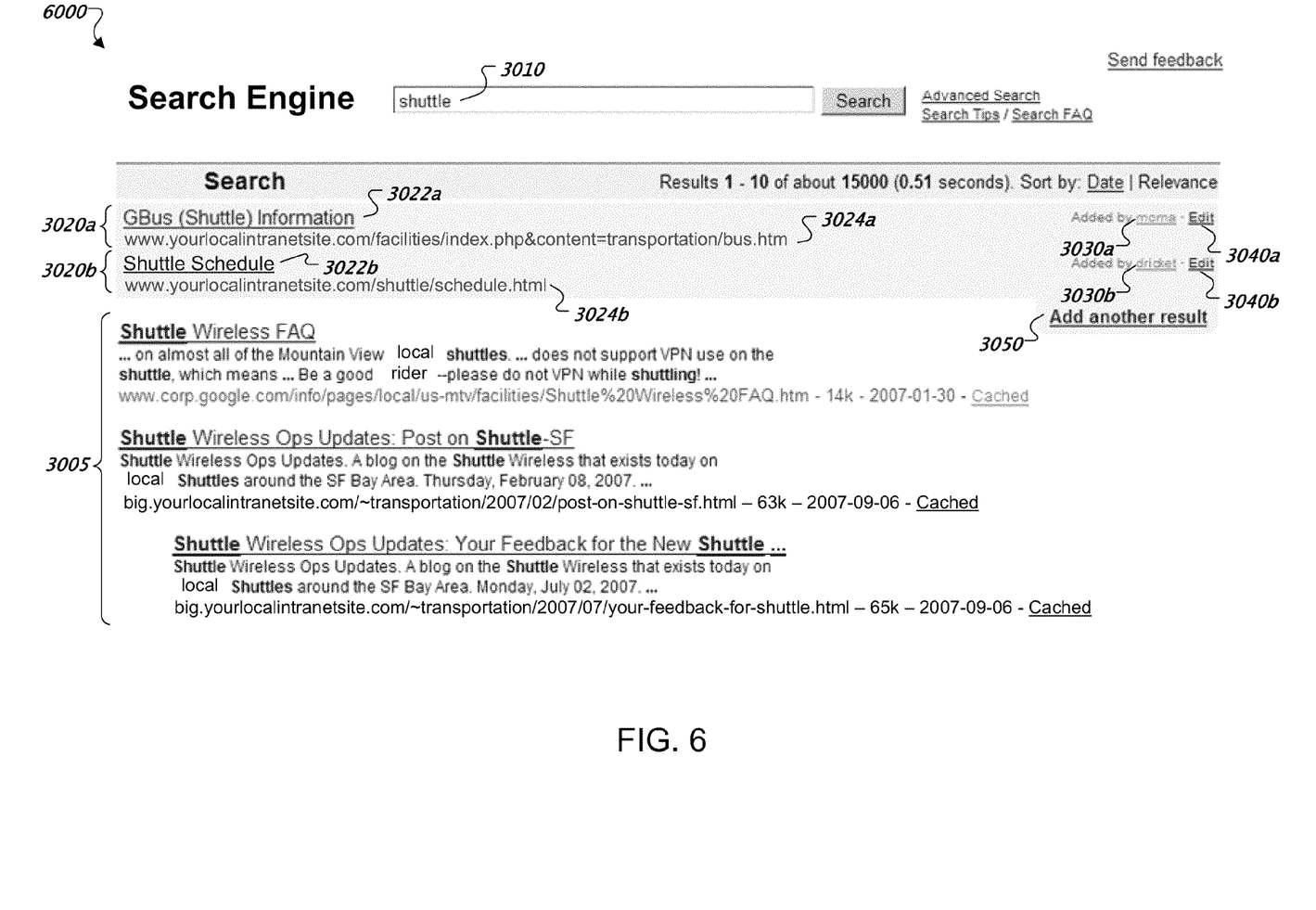
FIG. 6 illustrates an example web page of search results including the alternative search result from FIG. 5.

FIG. 6 illustrates an example web page 6000 of search results 3005 including the alternative search result from FIG. 5. The new alternative search result submitted by the user using the user interface 4050 of FIG. 5 is displayed as alternative search result 3020b below the existing alternative search result 3020a. In some implementations, the alternative search results 3020a and 3020b are displayed in a more prominent position than the positions of the system-generated search results 3005. As an example, the alternative search results 3020a and 3020b are displayed at the top of the web page 6000, above the set of system-generated search results 3005.

The example web page 6000 includes an identifier 3030b for the user who submitted the new alternative search result 3020b. The identifier 3030b is displayed in proximity to the new alternative search result 3020b so as to indicate that the new alternative search result 3020b was submitted by that user. Displaying the user identifier provides accountability while publicly rewarding users who submit good alternative search results. The example web page 6000 also includes a user interface element 3040b for editing the associated new alternative search result 3020b. A different user who searches for the same query 3010 will be presented with the multiple alternative search results 3020a and 3020b and can edit or, optionally, delete either alternative search results 3020a or 3020b. The ability for users to edit or delete alternative search results submitted by other users provides a means for community moderation. The different user can also add another alternative search result by selecting the user interface element 3050.

In some implementations, a user can provide additional content when submitting an alternative search result for a given query. For example, the user interface 4050 of FIG. 4 can provide additional text boxes for adding further information (e.g., comments) about the resource referred to by the alternative search result. In one example, if the resource includes information about a particular department or service (e.g., a credit union), additional text boxes could be used to add a location, working hours, or phone numbers. If the resource includes information about a user (e.g., an employee), a text box could be used to add an address for the user's personal web site. The user interface 4050 can also include user interface elements to allow a user to upload content (e.g., an image of the user) to be displayed with the alternative search result or to provide an address for content (e.g., a location in a network file system where the user's résumé is stored) to be displayed as a hyperlink with the alternative search result.

In some implementations, a user can specify how the alternative search result will be available to users of the search system 1014. For example, if the user is providing an alternative search result for a query about an upcoming event, the user may wish to limit the period during which the alternative search result will be returned for a search of the query. The user interface 4050 could include checkboxes for various time periods (e.g., a week, a month, a quarter of a year) or could provide a calendar feature for the user to select a start date and an end date to specify when the alternative search result would be available to users.

In some implementations, the set of alternative search results for a query returned for a particular user may depend on one or more parameters, e.g., the language of the search system interface used by the user, the location of the user, or the membership of the user in a particular group. In some implementations, a user submitting an alternative search result can specify the subpopulation of users for which the alternative search result will be available. For example, if the user is providing an alternative search result that refers to a resource that is of interest to a particular department (e.g., engineering, marketing, or legal) or user group, the user can specify that the alternative search result will only be returned for users in the particular group, e.g., by selecting a checkbox included in the user interface 4050 for the particular group. In other implementations, the subpopulation of users for which an alternative search result will be available can be automatically limited. For example, alternative search results submitted in German could be available only to users located in Germany or only to users who use a search system interface presented in German. In some implementations, a user submitting a query can specify one or more parameters that affect the set of alternative search results returned for the query. For example, if the user is submitting the query in French but is fluent in German, the user can specify or request that the user receives alternative search results for German users. Some requests can be rejected by a system administrator or automatically denied by the search system, for example, if the user is not authorized to receive the requested alternative search results (e.g., alternative search results restricted to managers only).

Figure 7:
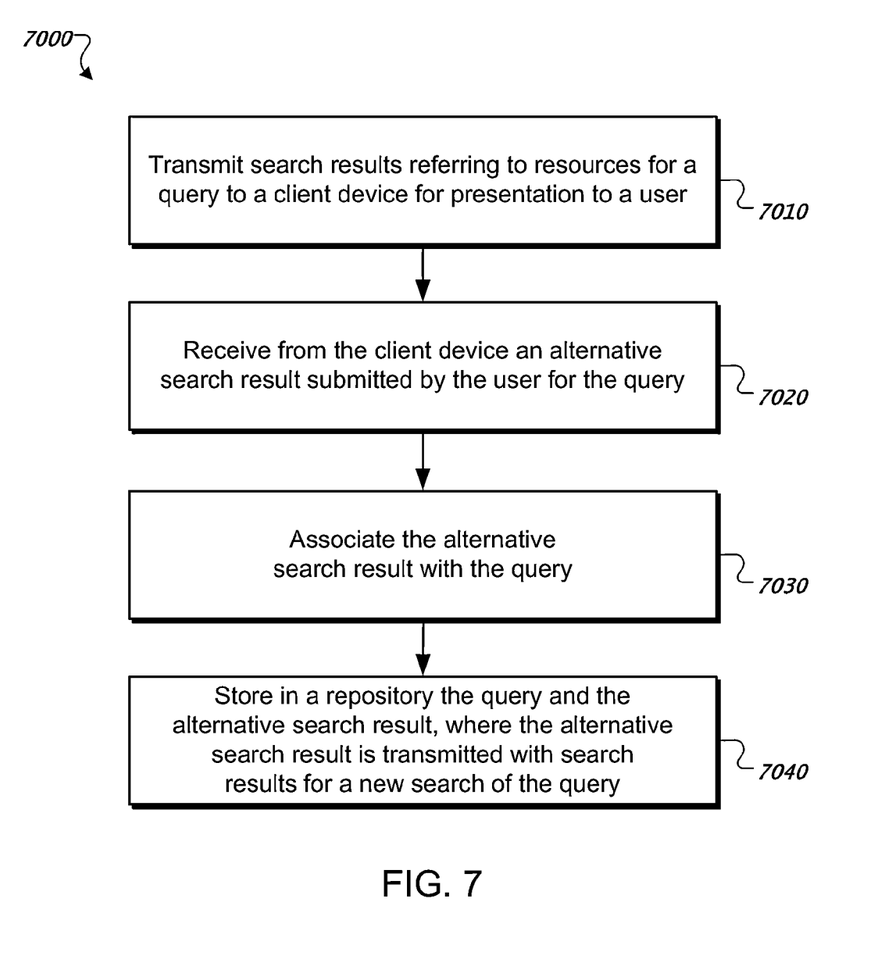
FIG. 7 shows an example process for adding a new alternative search result for a query in an alternative search result repository.

FIG. 7 shows an example process 7000 for adding a new alternative search result for a query in an alternative search result repository. For convenience, the example process 7000 will be described with reference to a system (e.g., the search system 1014 of FIG. 1) that performs the process 7000.

The system transmits a set of one or more search results for a query to a client device for presentation to a user, where each search result refers to a respective resource (step 7010). The system receives from the client device an alternative search result submitted by the user for the query (step 7020). The alternative search result can be received as a request sent from the client device to add the alternative search result. The received alternative search result can include a title for a resource, an address for the resource, and other content related to the resource.

The system associates the alternative search result with the query (step 7030), so that the alternative search result will be returned for any user that submits a new search of the query. In some implementations, the system also associates an alternative search result submitted for a given query with other queries that are synonyms of the given query or that include terms that are synonyms of the terms of the given query.

In some implementations, the system associates the alternative search result with each term of the one or more terms of a given query, so that the system returns the alternative search result in response to a search for any query that includes at least one of the one or more terms of the given query. For example, if the user submits an alternative search result 3020b of FIG. 6 for a query "shuttle bus," the search system 1014 can associate the alternative search result 3020b with the terms "shuttle" and "bus." As a result, if a different user submits on a client device a query for "shuttle service," for example, the search system 1014 can transmit the alternative search result 3020b to the client device for presentation to the different user.

In some scenarios, if a given query has multiple terms (e.g., "shuttle bus"), a result page for the given query might include duplicate or equivalent (e.g., different title and same address) alternative search results if one or more users submitted alternative search results referring to the same resource for queries of different terms (e.g., "shuttle" and "bus") of the given query. In some implementations, the system can prevent duplicate or equivalent alternative search results from being returned for a query, for example, by comparing the addresses of the alternative search results associated with the query or the query terms and disassociating from the query or the query terms all but one of the alternative search results with identical or equivalent addresses.

In some implementations, the system receives from the client device an identifier for the user who submitted the alternative search result. The system can associate the user identifier with the alternative search result and can transmit the user identifier with the alternative search result, so as to indicate that the alternative search result was submitted by the user identified by the identifier.

Returning to the example process 7000, the system stores in a repository (e.g., a database) the query and the alternative search result, where the alternative search result is transmitted with the set of one or more search results for a new search of the query (step 7040). Data in the repository can be accessed or processed using proprietary or open-source computer languages, e.g., Structured Query Language (SQL) or MySQL.

The system can transmit the alternative search result to a client device for presentation to a user who submits a search for the query. The alternative search result can be retrieved from the repository and made available to the user as dynamic content in a hypertext document (e.g., a web page of search results) using server-side scripts. For example, the server-side scripts can be Hypertext Preprocessor (PHP) scripts embedded within the result page and executed by a server in the search system 1014 before the result page is sent to a client device 1004 for presentation to the user.

In some implementations, the system transmits to the client device instructions with the alternative search result. The instructions can include instructions (e.g., as a client-side script) for displaying the alternative search result in a more prominent position than the positions of the one or more search results in the set. In some implementations, in response to a new search of the query submitted by a different user, the system transmits the alternative search result with instructions to a different client device for presentation to the different user. The instructions can include instructions (e.g., as a client-side script) for presenting the alternative search result and a user interface for editing or deleting the alternative search result.

In some scenarios, a particular query is associated with multiple alternative search results. In some implementations, for each of the multiple alternative search results, the system tracks the number of times the alternative search result is presented to a user (i.e., an impression), the number of times the alternative search result is selected (e.g., clicked) by a user, or both numbers. The system can rank the multiple alternative search results based on the tracked numbers, and the multiple alternative search results can be ordered according to rank when presented to a user. For example, the alternative search results can be ranked according to the number of times each result is selected by a user, where the alternative search result with the greatest number of selections is displayed at the top of the list of alternative search results. In another example, the alternative search results can be ranked according to a click through rate (e.g., the ratio of the number of selections to the number of impressions) computed for each result, where the alternative search result with the highest click through rate is displayed at the top of the list of alternative search results. In some implementations, the number of alternative search results presented to a user is limited to a predetermined number N, so that only the top N ranked alternative search results are presented. In some implementations, an alternative search result is available for presentation to users during a predetermined trial period. In some implementations, an alternative search result will be available beyond the predetermined trial period if it exceeds a minimum threshold, e.g., a selection threshold or a click through rate threshold.

In some implementations, in addition to queries and associated alternative search results (e.g., as titles and addresses), the system stores additional information in the repository. For a given alternative search result, the repository can include, for example, an identifier for the user, the date and time of the submission, the number of impressions, the number of selections, the click through rate, or content, as described above. In some implementations, the system can generate automated messages based on the information stored in the repository to provide feedback to users who submit alternative search results. For example, the search system 1014 can send a message to a user (e.g., as an automatically generated e-mail addressed to the user identifier) notifying the user that one of the user's submitted alternative search results has been edited or deleted. The message can include the modified alternative search result if it was edited and an identifier for the user who edited or deleted the result, providing a means for the users to collaborate on how the alternative search result should be specified. In one example, the user can be notified if an alternative search result submitted by the user is being removed by the search system 1014, e.g., because the trial period is over or the rank is too low. In another example, the user can be notified if an alternative search result submitted by the user is receiving a high number of selections or has a high click through rate, as a form of positive reinforcement.

In some implementations, the system maintains profile pages for users who submit alternative search results. A user can access the user's profile page to view, for example, a history of the user's submitted alternative search results, including the number of impressions, the number of selections, and the click through rate for each result. This information can be retrieved from the repository and made available to the user as dynamic content in a hypertext document (e.g., a web page) using server-side scripts. The profile page can additionally include a quality rating (e.g., stars) for the user or the user-submitted alternative search results as an incentive or a reward for users who submit results that are popular with other users. In some implementations, a quality rating is displayed with a user identifier when the user identifier is displayed in proximity to an alternative search result. In some implementations, if the user has submitted a particular alternative search result for multiple queries, the profile page includes a tool that allows the user to update the address of the particular alternative search result once for all the queries, eliminating the need for the user to independently update the result address for each of the multiple queries.

In some implementations, the alternative search results submitted by a user are available to all users of the search system 1014 (e.g., a corporate intranet search system). In other implementations, the alternative search results submitted by a user are available to a subset of the users of the search system 1014 (e.g., a public Internet search system). For example, an alternative search result can be available to a small subset of the user population for an initial trial period. If the alternative search result exceeds a minimum threshold (e.g., for a number of selections or a click through rate), the search system 1014 could make the alternative search result available to a larger subset of the user population, with the potential for the result to be made available to the entire user population. This reduced impression set technique could be used for a search system of a social network, where a user's alternative search result is initially available only to the user's network of friends. As the alternative search result receives additional selections or achieves a higher click through rate, the alternative search result could be made available to a progressively larger network of friends and acquaintances.

In some implementations, the alternative search results are managed, stored, and served by a collaborative search system that is independent of the search engine-based search system (e.g., the search system 1014 of FIG. 1). For example, a user can submit a query in an interface of the collaborative search system. In response, the collaborative search system can simultaneously send the query to one or more search engine-based search systems (e.g., systems selected by the user) and search an alternative search result repository on the collaborative search system. When system-generated search results are returned from the one or more search engine-based search systems, the collaborative search system can modify the returned system-generated search results to insert the retrieved alternative search results before transmitting the combined search results to the client device for presentation to the user. The separate collaborative search system can provide the collaborative result feature to users without requiring modifications to the search engine-based search systems.

In some implementations, the collaborative result feature can be provided by a web browser running on the client device. For example, the user can use a custom web browser (or add a web browser plug-in), which automatically searches for alternative search results whenever the user submits a query in an interface of any search system. The search for alternative search results can be transparent to the user, who submits the query directly to the search system of the user's choice. The web browser can modify the result page returned by the chosen search system to insert any retrieved alternative search results before displaying the result page to the user.

In some implementations, alternative search results can be stored and searched on a user's client device. For example, the user can use a custom web browser (or add a web browser plug-in), which stores a cache of alternative search results on the client device. When the user submits a query, the cache can be searched to provide alternative search results for the query. The ability to retrieve alternative search results maintained locally on the client device reduces the need to search for alternative search results on the network and, hence, reduces network traffic. The client device can periodically contact the collaborative search engine to provide new alternative search results submitted by the user and to retrieve new alternative search results submitted by other users.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter effecting a machine-readable propagated signal (e.g., a machine-generated electrical, optical, or electromagnetic signal), or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a submission of a first resource locator for a first alternative search result by a first user using a first user device, wherein the submission by the first user comprises a user selection by the first user of a first subpopulation of users, among a plurality of subpopulations of users of a search engine, to receive the first alternative search result in addition to search results generated by the search engine for a first query;
associating the first query with the first alternative search result and the first subpopulation of users selected by the first user;
receiving a second query submitted from a second user device by a second user different from the first user;
obtaining, from the search engine, second search results responsive to the second query;
determining that the first query matches the second query and that the second user is a member of the first subpopulation of users selected by the first user to receive the first alternative search result in addition to search results generated by the search engine for the first query;

in response to the determining, generating a search results page that includes the first alternative search result in addition to one or more of the second search results; and providing the search results page to the second user device for presentation to the second user.

2. The method of claim 1, wherein the search results page provides an identifier of the first user with the first alternative search result submitted by the first user.

3. The method of claim 1, wherein the first resource locator of the first alternative search result is not identified by any of a number of top-ranked search results previously provided to the first user for the first query.

4. The method of claim 1, wherein the submission comprises additional content for the first alternative search result, the additional content being content submitted by the first user, the additional content comprising an image, additional text, or an additional resource locator, and wherein the search results page includes the first alternative search result and the additional content submitted by the first user.

5. The method of claim 1, wherein generating the search results page that includes the first alternative search result comprises generating a search results page that presents the first alternative search result in a more prominent position than any of the one or more second search results generated by the search engine.

6. The method of claim 1, wherein the first subpopulation of users comprises a subpopulation of social contacts of the first user.

7. The method of claim 1, wherein the first subpopulation of users comprises users in a particular department of an organization.

8. The method of claim 1, wherein receiving the submission comprises receiving a selection by the first user of a first checkbox of a plurality of presented checkboxes, each checkbox corresponding to a particular subpopulation of users of the plurality of subpopulations of users of the search engine, the first checkbox corresponding to the first subpopulation of users.

9. The method of claim 8, further comprising:
receiving the first query from the first user; and
providing a first search results page to the first user, the first search results page including a user interface for receiving user input of text, and wherein receiving the submission of the first resource locator for the first alternative search result comprises receiving user input of text by the first user in the user interface of the first search results page.

10. A system comprising:
one or more computers and one or more storage devices storing instructions that are operable, when executed by the one or more computers, to cause the one or more computers to perform operations comprising:
receiving a submission of a first resource locator for a first alternative search result by a first user using a first user device, wherein the submission by the first user comprises a user selection by the first user of a first subpopulation of users, among a plurality of subpopulations of users of a search engine, to receive the first alternative search result in addition to search results generated by the search engine for a first query;
associating the first query with the first alternative search result and the first subpopulation of users selected by the first user;
receiving a second query submitted from a second user device by a second user different from the first user;
obtaining, from the search engine, second search results responsive to the second query;
determining that the first query matches the second query and that the second user is a member of the first subpopulation of users selected by the first user to receive the first alternative search result in addition to search results generated by the search engine for the first query;
in response to the determining, generating a search results page that includes the first alternative search result in addition to one or more of the second search results; and
providing the search results page to the second user device for presentation to the second user.

11. The system of claim 10, wherein the search results page provides an identifier of the first user with the first alternative search result submitted by the first user.

12. The system of claim 10, wherein the first resource locator of the first alternative search result is not identified by any of a number of top-ranked search results previously provided to the first user for the first query.

13. The system of claim 10, wherein the submission comprises additional content for the first alternative search result, the additional content being content submitted by the first user, the additional content comprising an image, additional text, or an additional resource locator, and wherein the search results page includes the first alternative search result and the additional content submitted by the first user.

14. The system of claim 10, wherein generating the search results page that includes the first alternative search result comprises generating a search results page that presents the first alternative search result in a more prominent position than any of the one or more second search results generated by the search engine.

15. The system of claim 10, wherein the first subpopulation of users comprises a subpopulation of social contacts of the first user.

16. The system of claim 10, wherein the first subpopulation of users comprises users in a particular department of an organization.

17. The system of claim 10, wherein receiving the submission comprises receiving a selection by the first user of a first checkbox of a plurality of presented checkboxes, each checkbox corresponding to a particular subpopulation of users of the plurality of subpopulations of users of the search engine, the first checkbox corresponding to the first subpopulation of users.

18. The system of claim 17, wherein the operations further comprise:
receiving the first query from the first user; and
providing a first search results page to the first user, the first search results page including a user interface for receiving user input of text, and wherein receiving the submission of the first resource locator for the first alternative search result comprises receiving user input of text by the first user in the user interface of the first search results page.

19. A computer program product, encoded on one or more non-transitory computer storage media, comprising instructions that when executed by one or more computers cause the one or more computers to perform operations comprising:
receiving a submission of a first resource locator for a first alternative search result a first user using a first user device, wherein the submission by the first user comprises a user selection by the first user of a first subpopulation of users, among a plurality of subpopulations of users of a search engine, to receive the first alternative search result in addition to search results generated by the search engine for a first query;

associating the first query with the first alternative search result and the first subpopulation of users selected by the first user;

receiving a second query submitted from a second user device by a second user different from the first user;

obtaining, from the search engine, second search results responsive to the second query;

determining that the first query matches the second query and that the second user is a member of the first subpopulation of users selected by the first user to receive the first alternative search result in addition to search results generated by the search engine for the first query;

in response to the determining, generating a search results page that includes the first alternative search result in addition to one or more of the second search results; and providing the search results page to the second user device for presentation to the second user.

20. The computer program product of claim 19, wherein the search results page provides an identifier of the first user with the first alternative search result submitted by the first user.

21. The computer program product of claim 19, wherein receiving the submission comprises receiving a selection by the first user of a first checkbox of a plurality of presented checkboxes, each checkbox corresponding to a particular subpopulation of users of the plurality of subpopulations of users of the search engine, the first checkbox corresponding to the first subpopulation of users.

\* \* \* \* \*